June 24, 1958
G. J. SHOMPHE
2,839,934
GYROSCOPE
Filed Feb. 3, 1954
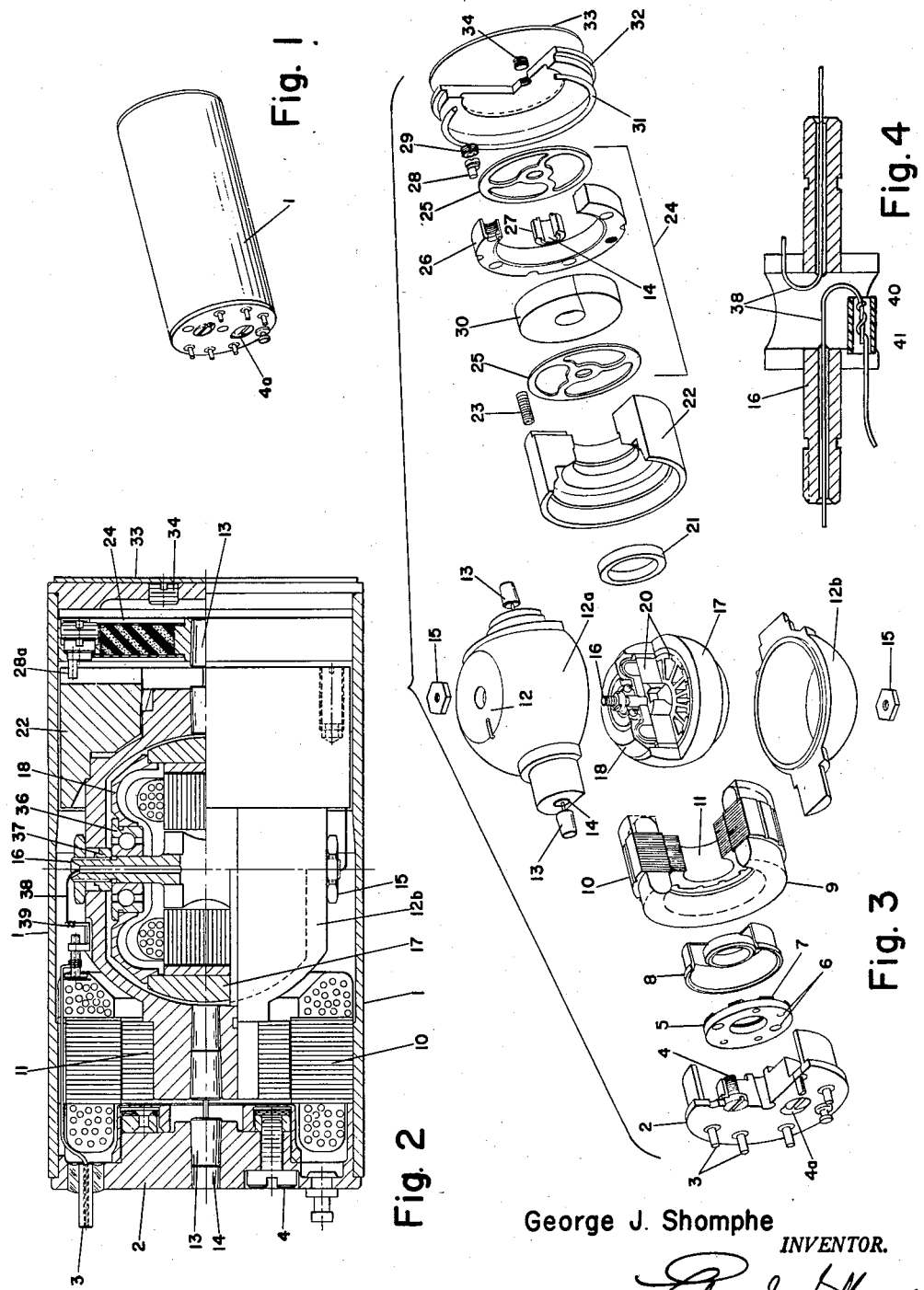
George J. Shomphe
INVENTOR.
BY 
ATTORNEY

United States Patent Office 2,839,934
Patented June 24, 1958

2,839,934
GYROSCOPE

George J. Shomphe, Nashua, N. H., assignor, by mesne assignments, to Sanders Associates, Incorporated, Nashua, N. H., a corporation of Delaware Application February 3, 1954, Serial No. 407,892

10 Claims. (Cl. 74—5.7)

This invention relates generally to gyroscopes, and more particularly rate gyros, of the type employed in modern aircraft, guided missiles and the like. It is particularly directed to the provision of means for compensating for changes in volume within the gyro housing caused by temperature variations.

It is, therefore, an object of the present invention to provide an improved gyro with means for compensating for changes in the volume within the gyro housing.

Other and further objects will become apparent as the following description proceeds.

In the gyro hereinafter described all moving bearings are entirely eliminated from the gyro gimbal suspension. The support and the centering of the gimbal are accomplished by means of improved supporting elements which embody an invention described in a copending application. These torsion bars not only provide the required supporting means, but also a restraining torque which resists the motion of the gimbal about the output axis. Friction is essentially eliminated from the output shaft suspension.

In accordance with the present invention there is provided a gyroscope comprising a gimbal with a rotor disposed within the gimbal. An axis for the rotor extends through the gimbal and bearings are carried on the axle for the rotor. Special means, preferably end caps constructed of an elastic metal shaped as a hollow semi-toroid member, that is, having one face channeled to provide resiliency to forces applied to the periphery of an end cap are provided for holding the bearings in position under spring tension. In accordance with another feature of the invention a gimbal is provided with a hollow axis and electrical contacts for the stator are provided which comprise hooked leads passing through the axis and being longitudinally adjustable with respect thereto.

By virtue of the various features of invention employed in the construction herein described there is achieved a subminiature gyro, less than one inch in diameter, less than two inches long and weighing only 2.9 ounces. This constitutes the smallest gyro now known to exist and meets or exceeds the performance characteristics of larger rate gyros, yet is capable of lower cost production than other larger available instruments.

For a more detailed description of the present invention, reference may now be made to the following description taken in connection with the accompanying drawings.

In the drawing, Fig. 1 is a perspective side view of a gyroscope embodying the present invention shown in actual size; Fig. 2 is an enlarged, side elevation view, partly in section, of the gyroscope of the present invention; Fig. 3 is an exploded perspective view, partly in section, of the gyro shown in Figs. 1 and 2; and Fig. 4 is an enlarged cross-sectional view of the central shaft structure of the gyro.

Referring now more particularly to the drawing, the gyro embodying the present invention is shown comprising a housing 1 of generally cylindrical form having attached at one end a cap 2 which may, for example, be mounted directly on an antenna platform.

Provided in the end cap 2 are leads 3 and null adjusting screws 4. The screws are inserted in their respective holes in the ring 5 through the elongated holes 4a in the end cap, which permit a limited amount of lateral movement of the screws. Null adjusting ring 5 is provided adjacent to the end cap 2 with the screws and rivet holes 6 and pick-off adjustment elements or laminations 7, as shown. A sealing ring 8 is provided at the opposite side of ring 5 with its outer edge surrounding the ring 5 and extending into the cap 2, followed by the pick-off windings 9 in which there is disposed a pick-off stator 10 and rotor comprising transformer laminations 11, as shown.

The gimbal 12 is disposed, in the central portion of the housing 1, as shown in Fig. 2, and comprises the split upper and lower sections 12a and 12b which are shown in detail in Fig. 3.

Torsion bars 13 are disposed at opposite ends of the gimbal. They each comprise a narrow central portion which provides the spring restraint and enlarged end portions which are formed integrally therewith and effect rigid and strong supports. The end portions of the bars are tapered and the supports on the gimbal, the end cap 2, and the hub or mount 27 of the S-spring assembly, presently to be described, are correspondingly tapered. They provide rigid support while permitting rotative movement of the gimbal about the output axis, caused by the angular velocity of the rotor. The torsion bars also afford a restraining torque which resists the angular movement about the output axis of the gimbal and returns the gimbal and rotor to their normal relative angular positions immediately after the input force to the gyro has been removed. Friction is thus essentially eliminated from the output axis of the gyro.

The nuts 15 at the top and bottom of the gimbal sections secure the shaft 16 of the rotor 17. Suitable bearing retainers and bearings 36 are disposed at each end of the rotor shaft providing a symmetrical, balanced, non-cantilever type of support. The caps 18, which form a special feature of the present invention as presently to be described in detail, are provided for the rotor at each end thereof. The two sections of the gimbal are retained by ring 21 and pick-off rotor 11. An annular temperature compensator member 22, hereinafter further referred to, in which several balance screws 23 may be secured, one being shown in Fig. 3, is disposed at one end of the gimbal 12.

Referring now in more detail to the special feature of the present invention embodied in the end caps 18, this feature permits the gyroscope to operate at very high speeds, even under extremely wide ranges of temperature.

As shown in the drawing, the rotor 17 is external to the stator 20 and is formed integrally with the hysteresis ring. The inner races of the rotor bearings 36 are mounted on the shaft 16 and the end caps 18 engage the outer bearing races and are held in position under spring tension. The nuts 37 threadedly engage the shaft 16 and exert pressure through the bearing races which, in turn, bear on the end caps 18, as shown. It is essential that the pressure applied to the bearings be substantially constant throughout the temperature range in which the gyro operates in order that a constant rotor speed may be maintained.

Dissimilar coefficients of expansion of the various parts, particularly the shaft 16, would result in the binding of the rotor or movement of the bearing along the shaft. The spring loading of the bearings in the manner described prevents these results.

The end caps are formed substantially in the shape of a semi-toroid, with the outer surfaces having flat planes to permit ease of machining and provide indentations for mounting the rotor and bearing. Thus, the rotor is assembled between the end caps around the shaft 16. The races 36 of the roller bearings are held in place by the pressure of the end caps secured by the nut 37.

Heretofore it had been the practice to extend the leads from the stator winding through the hollow shaft 16 and to connect them at the respective binding posts. In fabricating the gyros, substantial loss was occasioned by the frequent breakage of the leads from the stator windings. In accordance with the present embodiment of the invention, relatively heavy solid wires 38 are inserted through the hollow shaft 16, which wires are retractable and are hooked at their ends which are positioned at the center of the shaft, as shown in detail in Fig. 4. After the stator windings are mounted on the shaft the retractable leads are drawn away from the center, permitting connection with the stator leads 40 as shown in Fig. 4. A small piece of insulating tubing is employed to cover the connection. The heavier leads 38 are then returned to their central position with respect to the shaft. These two wire connections and the ground provide the three external electrical connections for the gyro.

An arrangement is provided for preventing special strain on the operating parts of the gyro, particularly the torsion bars, which occur due to different rates of expansion of the parts within the gyro, with temperature changes. For this purpose an S-spring assembly 24 is disposed at one end of the housing. This assembly comprises a pair of S springs 25 disposed on opposite sides of a ring member 26, as shown. A hub element 27 which has the torsion bar tapered mounting 14, previously mentioned, and output axis stop pin 28 with lock 29 are provided, these parts being shown separately in Fig. 3 and assembled in Fig. 2. The pin 28 extends into a slot 28a in the annular member 22 which is fixed and rotates with the gimbal. The slot 28a is of a predetermined width and the pin 28 thus limits the amount of angular movement which is allowed the ring 22 and gimbal 12.

There is provided an annular pressure compensator member 30. This member is of a cellular material such as foam rubber and its cells contain a gas or air which is compressible as hereinafter further explained.

An O ring or gasket 31, a housing-cap 32, and name plate 33 are secured, in the order named, at the S-spring end of the housing. The housing is filled with a suitable damping fluid, such as oil, through a plug 34 in housing cap 32.

The compensator ring member 30, as stated, provides for compensation for volume changes within the housing of the gyro housing. The housing or case being filled with a suitable damping fluid or oil, temperature cycling occasions different rates of expansion between the fluid and the housing. The differences in expansion are compensated for by the compression of the gas within the annular member 30. This member 30, as stated above, being constructed of a cellular material, contains gas or air, which is compressible and compensates for the relative changes in volume occasioned by the differences between the expansion of the fluid and parts within the housing and the housing itself. Without such compensation, leakage or failure of the gyro would result.

The S-spring assembly permits the rotor and the torsion bars at this end of the housing to be relatively free for longitudinal movement, while remaining rigidly fixed for transverse forces. Among its other advantages, this arrangement, as above pointed out, compensates for special strains on the torsion bars and other parts of the gyro.

In order to maintain the stability of the gyro, as stated, the fluid in the housing provides a damping of the movement of the gimbal about the output axis. Also, the gimbal being immersed in the fluid is given a partially buoyant support which has the effect of reducing its sensitivity to linear acceleration and shock.

The damping member 22 is constructed of a suitable material, such as nylon, which expands with increasing temperature, reducing the gap between it and the housing. It thus increases the shearing damping action of the fluid so as to compensate for its reduction due to the lowering of viscosity of the fluid with temperature increases. A small viscosity variation of the damping fluid with temperature over a wide range and the abovementioned compensation permits operation of the gyro with a minimum of damping variations down to extremely low temperatures, without requiring the use of external heaters to stabilize the damping fluid temperature. The damping fluid employed for the present gyro, which is commercially available as Dow Corning 200 Series Silicone, has this small viscosity variation with temperature characteristic.

The pick-off of the present gyro is basically a differential transformer, the mutual inductance between the primary and secondary of which is varied with variations in the relative angular position of the core laminations. This in turn is effected by the rotation of the output shaft or gimbal. Thus, this movement is translated into an electrical signal which is proportional and phase sensitive, that is directly responsive, to the gyro input angular velocity.

While there has been shown and described a particular embodiment of the present invention, it will be apparent to those skilled in the art that various changes and modifications may be made without departing from the spirit of the invention, and it is therefore intended in the appended claims to cover all such changes and modifications as fall fairly within the spirit and scope of this invention.

What is claimed is:

1. A gyroscope comprising a gimbal; an axle extending centrally through said gimbal and secured thereto at its opposite ends; an annular rotor surrounding said axle; a pair of annular semi-toroidal end caps surrounding said axle with their peripheral edges engaging said rotor; and bearings surrounding said axle at opposite end portions thereof, engaging the inner edges of said end caps and holding them by pressure contact in engagement with said rotor.

2. A gyroscope comprising a gimbal; an axle extending centrally through said gimbal and secured thereto at its opposite ends; an annular rotor surrounding said axle; a pair of annular semi-toroidal elastic metal end caps surrounding said axle with their peripheries engaging said rotor; and bearings surrounding said axle at opposite end portions thereof, engaging the inner edges of said end caps and holding them under spring pressure in an engagement with said rotor.

3. A gyroscope comprising: a gimbal; an axle extending centrally through said gimbal and secured thereto at its opposite ends; an annular rotor surrounding said axle; a pair of annular generally semitoroidal end caps surrounding said axle with their peripheral edges engaging said rotor, one face of each of said end caps being channeled to provide resiliency; and bearings surrounding said axle at opposite ends thereof, engaging the inner edges of said end cap and holding them by pressure contact in engagement with said rotor.

4. A gyroscope comprising: a gimbal; an axle extending centrally through said gimbal and secured thereto at its opposite ends; an annular rotor surrounding said axle; a pair of annular end caps surrounding said axle with their peripheral edges engaging said rotor, each of said caps being generally of the shape of a truncated semi-toroid with one face of each of said end caps being circularly channeled to provide resiliency; and bearings surrounding said axle at opposite ends thereof, engaging the inner edges of said end cap and holding them by pressure contact in engagement with said rotor.

5. A motor for inertial guidance-type instruments having a mass member pivotal about an axis, comprising: a stator core; a stator winding carried by said core; an annular rotor surrounding said stator; a pair of annular semi-toroidal end caps surrounding the ends of said stator windings with their peripheral edges engaging said rotor; and bearings carried by said end caps, said bearings being coupled to said stator ends and held in pressure contact in engagement with said end caps.

6. An end cap bearing support for a motor, comprising: member having generally the shape of a truncated semitoroid having a central portion for engaging a bearing for part of said motor for assembly to a shaft, having an annular groove in one face for providing axial resilience and resilience along a plane normal to said shaft for said cap and for enabling pre-spring-loading of said bearing when said end cap is assembled to said shaft, and having a perimeter for circumferentially engaging another part of said motor.

7. An end cap bearing support for a motor, comprising: a disk-like member having an aperture through the center for engaging a bearing for part of said motor for assembly to a shaft, having in one face an annular groove deeper than the wall thickness of said member for providing axial resilience and resilience in the plane of said member and for enabling pre-spring-loading of said bearing when said end cap is assembled to said shaft, and having an outer perimeter grooved for circumferentially engaging another part of said motor.

8. An end cap bearing support for a motor, comprising: a member having generally the shape of a truncated semitoroid, having an aperture through the center of said member for engaging a bearing for part of said motor for assembly to a shaft, having in one face of said member an annular groove deeper than the wall thickness of said member for providing axial resilience and resilience in the plane of said member and for enabling pre-spring-loading of said bearing when said end cap is assembled to said shaft, and said member having an outer perimeter grooved for circumferentially engaging another part of said motor.

9. An end cap bearing support for a motor, comprising: a disk-like member having an aperture through the center for engaging a bearing for part of said motor for assembly to a shaft, having in the inner face thereof an annular groove deeper than the wall thickness of said member and for enabling pre-spring-loading of said bearing when said end cap is assembled to said shaft, and having an outer perimeter grooved for circumferentially engaging another part of said motor.

10. An end cap bearing support for a motor, comprising: a member having generally the shape of a truncated semitoroid, having an aperture through the center of said member for engaging a bearing for part of said motor for assembly to a shaft, having in the inner face of said member an annular groove deeper than the wall thickness of said member for providing axial resilience and resilience in the plane of said member and for enabling pre-spring-loading of said bearing when said end cap is assembled to said shaft, and having an outer perimeter grooved for circumferentially engaging another part of said motor.

References Cited in the file of this patent

UNITED STATES PATENTS

| | | |
|---|---|---|
| 1,067,808 | Fuchs | July 22, 1913 |
| 2,410,002 | Bach | Oct. 29, 1946 |